United States Patent
Corning

(10) Patent No.: US 11,095,613 B2
(45) Date of Patent: Aug. 17, 2021

(54) SYSTEM OF SMART EDGE SENSORS

(71) Applicant: Nusantao, Inc., Cupertino, CA (US)

(72) Inventor: Raymond Vincent Corning, Lander, WY (US)

(73) Assignee: NUSANTAO, INC., Cupertino, CA (US)

( * ) Notice: Subject to any disclaimer, the term of this patent is extended or adjusted under 35 U.S.C. 154(b) by 209 days.

(21) Appl. No.: 16/366,971

(22) Filed: Mar. 27, 2019

(65) Prior Publication Data

US 2019/0379639 A1  Dec. 12, 2019

Related U.S. Application Data

(60) Provisional application No. 62/681,844, filed on Jun. 7, 2018.

(51) Int. Cl.
*H04L 29/06* (2006.01)
*G06F 21/72* (2013.01)
*G06F 21/60* (2013.01)

(52) U.S. Cl.
CPC ........ *H04L 63/0263* (2013.01); *G06F 21/602* (2013.01); *G06F 21/72* (2013.01); *H04L 63/0485* (2013.01)

(58) Field of Classification Search
CPC ............. H04L 63/0263; H04L 63/0485; H04L 63/0227; H04L 63/0428; H04L 2209/805; H04L 9/0618; H04L 9/3239; H04L 2209/38; G06F 21/72; G06F 21/602; G06F 21/64

See application file for complete search history.

(56) References Cited

U.S. PATENT DOCUMENTS

| | | | | |
|---|---|---|---|---|
| 2011/0295967 A1* | 12/2011 | Wang | .................... | G06F 3/0646 709/212 |
| 2011/0296440 A1* | 12/2011 | Laurich | ................... | G06F 21/72 719/326 |
| 2012/0079080 A1* | 3/2012 | Pishevar | ................. | A63F 13/77 709/220 |
| 2014/0073291 A1* | 3/2014 | Hildner | ................... | H04W 8/24 455/411 |
| 2016/0255420 A1* | 9/2016 | McCleland | .......... | H04W 4/026 340/870.07 |
| 2017/0054611 A1* | 2/2017 | Tiell | .................... | H04L 43/0876 |

(Continued)

OTHER PUBLICATIONS

International Search Report and Written Opinion dated Jun. 21, 2019, for PCT/US2019/025258, filed Apr. 1, 2019, 9 pages.

(Continued)

*Primary Examiner* — J. Brant Murphy
(74) *Attorney, Agent, or Firm* — Womble Bond Dickinson (US) LLP; Joseph Bach, Esq.

(57) ABSTRACT

A system of smart edge sensors, wherein security and encryption is pushed to the edge of the network. In one example, an electronic device includes several sensors. The device is operated by a microprocessor. A plurality of smart edge devices are each interposed between a respective sensor and the microprocessor and intercepts communication between the sensor and the microprocessor. The smart edge device encrypt any data output by the sensor, and decrypt any data received from the microprocessor. In one example the smart edge device is implemented as a system on a chip (SoC).

23 Claims, 2 Drawing Sheets

(56) References Cited

U.S. PATENT DOCUMENTS

2017/0173262 A1* 6/2017 Veltz .................... A61B 5/0022
2020/0413248 A1* 12/2020 Yokum ................ H04W 12/50

OTHER PUBLICATIONS

Transmittal of International Preliminary Report on Patentability dated Dec. 17, 2020, for PCT/US2019/025258, filed Apr. 1, 2019, pp. 8.

* cited by examiner

SYSTEM OF SMART EDGE SENSORS

RELATED APPLICATION

This application claims priority benefit from U.S. Provisional Application No. 62/681,844, filed Jun. 7, 2018, the disclosure of which is incorporated herein in its entirety.

BACKGROUND

1. Field

This application relates to electronic devices having multiple sensors communicating with a processor, which transmits the data outside of the device.

2. Related Art

Various systems are known in the art for sensing environmental events, processing data relating to the environmental events, and transmitting such data outside of the system, e.g., over the Internet, a WiFi channel, a cellular network, etc. Such systems generally have plurality of sensors to detect the environmental event and generate electric signal corresponding to the sensed event.

In the context of this disclosure, the term sensor is used to indicate any device that bridges the physical world and an electronic device. For example, a microphone senses physical pressure changes and generates corresponding electric signal for the electronic device. Similarly, a speaker performs the reverse action by receiving electrical signal from the electronic device and generating pressure changes in the physical world to generate sound. Under the definition of this disclosure, a speaker is also considered a sensor, as it bridges the physical world and an electronic device (e.g., an amplifier). A physical action, on the other hand, describes an event in the physical world existing outside of the electronic device and the network. That is, reference to physical action excludes the electronic signal generation, manipulation and transmission.

Using the definition described herein, it can be seen that an electronic device, such as a cellphone, has multiple sensors: a microphone, a speaker, a light sensor, a distance sensor, an accelerometer, etc. These sensors exchange data with the main processor of the device. The processor may operate on the data and may also transmit the data outside of the device. In that sense, the sensors are at the edges of the network. Any data generated by a sensor from a physical action is generated at an edge of the network, and is transmitted into the network via a processor, and any data destined to a sensor travels the network until it reached the sensor at the edge, where it is transformed into a physical action.

With the proliferation of mobile devices, the number of sensors is multiplied several times fold. Additionally, devices are being augmented by additional sensors in the form of wearable technology. Similarly, the Internet of Things, IoT, adds many devices that include sensors, e.g., smart thermostats, smart watering timers, security cameras and door rings, etc. The data generated by all of these devices should be maintained confidential and secured. For example, it has been reported that hackers were able to hack security cameras and baby monitors and observe the video streams.

3. Problem to be Solved

In general, security measures are targeted at two areas of vulnerability: the communication link, i.e., the Internet, and the devices themselves, i.e., the processor and operating system. However, once a hacker is able to find an opening in one of these vulnerabilities, the hacker is able to obtain the sensors' data. For example, the hacker may be able to eavesdrop by setting up a video and/or audio feed from the hacked device to the hacker's device.

Regardless of the sophistication of the security software installed on a computing device, privacy and security is not practical when implemented on top of a processor with over 100 million gates, running an operating system with 100 million lines of code, in a browser with 5 million lines of code. The Internet of Things (IoT) and artificial intelligence (AI) applications dramatically increase the attack surface area, making enforcement of security and privacy impossible using current techniques.

Accordingly, a need exist for a system which is able to withstand hacking attacks and protect data, even in the event of a breach of the communication network or a processing environment.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention provide a system architecture that protects against unauthorized access to sensors' data.

The system architecture implements endpoint control and pushes security and encryption measures to the edges of the network, i.e., to the sensors.

Various disclosed embodiments enable increased security by encrypting sensors data prior to providing the data to the device's processor. Thus, if a hacker is able to breach the communication network or the security of the device itself, the hacker can only reach encrypted sensor data and, unless the hacker has a key, the encrypted data cannot be read or used.

Embodiments of the invention provide an encryption module having an input configured for receiving raw sensor data, encrypt the data, and output the encrypted data to a microprocessor of a device. The encryption module is exterior to the device's microprocessor and operates independently of the device's microprocessor. Consequently, a hacker that gains access to the device's microprocessor cannot alter the operation of the encryption module, and thus can't reach the sensors' raw data.

A system according to disclosed embodiments includes an electronic apparatus having a plurality of sensors; a device microprocessor for controlling the operation of the electronic apparatus; a plurality of encryption modules, each coupled between the device's microprocessor and one of the plurality of sensors; each of the encryption modules configured for intercepting output signal of a corresponding sensor, encrypt the output signal, and communicate the encrypted output signal to the device's microprocessor. At least one of the encryption modules further being configured to receive an input signal from the device's microprocessor, decrypt the input signal, and communicate the encrypted input signal to a corresponding sensor.

In certain embodiments, a smart edge module is provided, configured to be inserted between a communication bus of an electronic device and a sensor, the electronic device having a device processor running a device operating system, the smart edge module comprising: an interface adapter configured for receiving raw data from the sensor; a bus adapter configured for handling communications with the device bus; a module bus coupled to the interface adapter and bus adapter; a module processor configured for encrypting the raw data; and a module memory storing a module operating system. The smart edge module may be implemented as a system on a chip.

In some embodiments, the module processor may be configured to encrypt the raw data according to instructions of a local contract stored in the module memory. The local contract may be a blockchain contract. The smart edge module may further comprise a command filter configured to discard unauthorized communication directed at the module processor. The command filter may be configured to decrypt incoming communication received by the bus adapter and inspect a header within said communication to determine validity of the communication.

In certain aspects, the smart edge module may further comprise an encryption accelerator configured for acceleration encryption of the raw data. It may further comprise a device driver configured to intercept communication on said device bus directed to said smart edge module, and perform entropy test on said communication.

In some embodiments, the device operating system may comprise one of Windows OS, iOS, WebOS, or Android, and the module operating system may comprise one of a version of Linux or a real-time operating system (RTOS). The smart edge module may further comprise a pre-processing module configured to filter or transform the raw data.

In further aspects, an electronic device is provided, comprising: a device processor executing a device operating system (OS); a device bus; a device memory coupled to the device bus; a plurality of sensors; at least one security module, interposed between at least one corresponding sensor of the plurality of sensors and the device bus, the security module configured to receive a raw data signal from the corresponding sensor, encrypt at least part of the raw data signal to generate an encrypted signal, and transmit the encrypted signal to the device bus.

The electronic device may further comprise a device driver residing in the device memory and configured to facilitate communication between the device processor and the security module. The security module may comprise a module processor running a module operating system different from the device operating system. The security module may further comprises: an interface adapter configured for receiving the raw data from the corresponding sensor; a bus adapter configured for handling communications with the device bus; a module bus coupled to the interface adapter and bus adapter. The security module may be fabricates as a system on a chip. The security module may further comprise a command filter configured to discard unauthorized communication directed at the module processor. The electronic device may further comprise a pre-processing module configured to filter the raw data signal and generate a filtered signal, wherein encrypting at least part of the raw data signal comprises encrypting the filtered signal.

According to further aspects, implemented in an electronic device having a device processor running a device operating system on a device bus and communicating with a plurality of sensors, a method is provided, comprising: providing a plurality of security modules and interposing each between a corresponding sensor of the plurality of sensors and the device bus; operating each of the security modules to perform the steps of: intercepting raw data signal output from the corresponding sensor; encrypting at least part of the raw data signal to generate encrypted signal; and transmitting the encrypted signal onto the device bus.

The method may further comprise maintaining a secure contract in a module memory of each of the security modules, and updating the security contract with decryption key and list of authorized readers. The method may further comprise maintaining a distributed version-control system for tracking changes in the security contract. The method may further comprise operating each of the security modules to perform the further steps of: intercepting each transmission of the device bus directed at the security module; and decrypting the transmission and deciphering whether a header in the transmission is acceptable header and, if yes, decrypting the remainder of the transmission; otherwise discarding the transmission. Deciphering whether the header in the transmission is acceptable header may comprise determining whether the transmission is a response to an outstanding request issued by the security module. The method may further comprise filtering the raw data signal to generate a filtered signal, wherein encrypting at least part of the raw data signal comprises encrypting the filtered signal.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

The following detailed description provides examples that highlight certain features and aspects of the innovative secure sensors system claimed herein. Different embodiments or their combinations may be used for different applications or to achieve different results or benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

In the various disclosed embodiments, data security is ensured by implementing the security processes at the edges of the technology stack. For example, data generated at the edges (i.e., by sensors) is pre-processed and encrypted at the edges upon creation. The encrypted data then remains secured throughout its transmissions and processing, until it is ready to be consumed at another edge (by another sensor), at which point it is decrypted. In this manner, any interception of the data prior to authorized consumption is able to only obtain encrypted data, which can't be deciphered without the proper key. A blockchain smart contract may be used to ensure that only authorized stakeholders can decide who will have access to the data, the metadata and the identity of the data generator. The smart contract defines stakeholders, device configuration, appropriate encryption keys for stake holders, ACL "Access Rights" to configuration (View, Modify), data (View), and meta-data. The smart contract may be maintained using GIT protocol, which is a distributed version-control system for tracking changes. The hash value of events and changes can be stored to global blockchain and when retrieved can be used by stakeholders to find correct versions and as validation.

(View), Identity (View), Statistics (View) and Contract Owner

Figure 1:
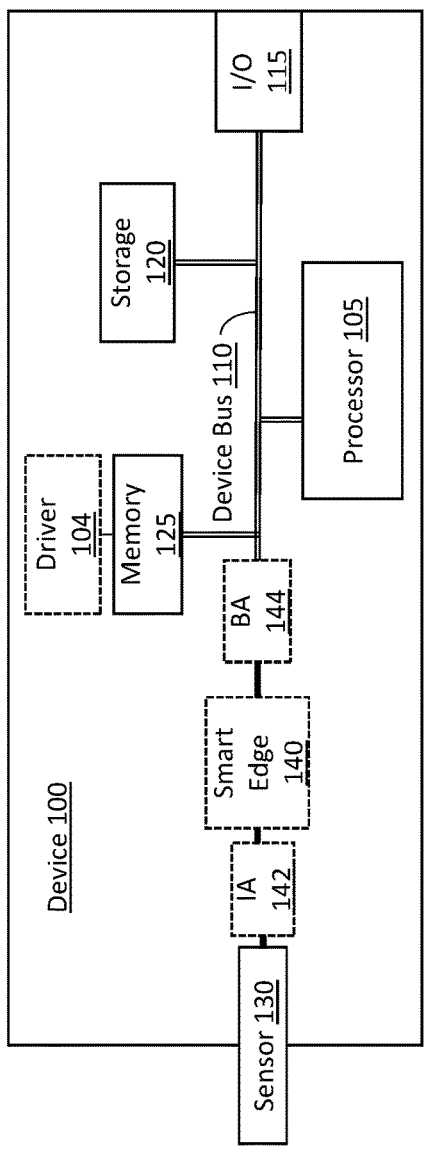
FIG. 1 illustrates a block diagram of an electronic device according to one embodiment.

FIG. 1 is block diagram schematically illustrating elements of an electronic device 100, according to an embodiment implementing edge security. Device 100 may be any electronic device, such as, e.g., a computer, a cellphone, a smart thermostat, a wearable device, etc. Device 100 may include many elements; however, only elements pertinent to the understanding of the embodiment are included in FIG. 1. For further clarity, in FIG. 1 elements that are conventional to device 100 are shown in solid lines, while elements that are novel and added by the embodiment are illustrated in dotted lines.

The device 100 is managed by a device processor 105 (e.g., iPhone Ax processor, Samsung's Exynos processor, Intel Core ix processors, etc.), executing instructions of an operating system (OS, e.g., Windows, iOS, WebOS, Android, etc.), and which communicates over device bus 110. The device bus 110 is connected to I/O module 115, which may include wired elements, such as Ethernet connection, and/or wireless elements, such as, e.g., WiFi, cellular, Bluetooth transceivers (not shown). Storage 120 is also attached to the bus 110, and may be used to store programs, data, etc. Memory 125 is used by processor 105 to save items needed for current processes, including running OS. Memory 125 is generally a cache memory.

Device 100 may include several sensors 130, but for simplicity only one is illustrated. Sensor 130 may be, e.g., microphone, imaging sensor, accelerometer, etc. Sensor 130 is illustrated partially outside the box of device 100, to indicate that it may be internal or external to the device 100. For example, a cellphone has an internal microphone, but may also use an external microphone as a part of a wired or wireless headset.

In the prior art devices, when sensor 130 detects a physical event (e.g., sound generated by pressure change in the case of a microphone), sensor 130 generates a signal that includes the data corresponding to the physical event. The signal of sensor 130 is sent over the device bus 110 to the processor 105. The processor 105 may operate on the signal, store the data in storage 120, and/or transmit the signal over I/O module 115. Thus, a hacker able to explore vulnerability in the device's security system can get access to the processor 105 and/or storage 120, and thereby to the data. Similarly, a hacker able to intercept communication sent from the I/O module 115 may be able to gain access to the data.

The embodiment of FIG. 1 prevents access to the sensor data, even upon a breach of security measures. Specifically, a security module 140, referred to herein as smart edge module, is interposed between the sensor 130 and processor 105. The smart edge 140 intercepts the signal with the raw data from the sensor, prior to the signal reaching the processor 105. The smart edge 140 encrypts the data and issues an encrypted signal to the processor 105. The processor 105 only receives encrypted data, such that when the processor stores or transmits the data, it is encrypted. Consequently, any breach which gains access to the processor 105, the storage 120, or intercepts a transmission, may only obtain the encrypted signal and thus be unable to decipher the data.

A device driver 104 resides in memory 104 and provides the communication link between the outside world and the smart edge 104, akin to a print driver or any other device drivers that enable communication with peripherals. Since driver 104 operates outside of the smart edge 140, it is considered to be operating in an insecure environment, and thus everything it handles is already encrypted. Driver 104 is responsible for transferring encrypted data to the smart edge (sensor 130) and is responsible for transferring encrypted data to a targeted location (e.g., processor 105). Since the data handled by driver 104 is encrypted, corruption of the device driver 104 could cause an interruption of service, but could not cause a data leak.

In order to make smart edge 140 universal for all sensors and buses, an interface adapter 142 handles transmissions between the smart edge 140 and sensor 130, while bus adapter 144 handles transmissions between smart edge 140 and bus 110. Bus 110 may be any known bus technology, such as, e.g., Direct Memory Access, SPI, Ethernet, etc.

With the embodiment of FIG. 1, data from sensor 130 is secured and cannot be deciphered without a decryption key. Going back to the example of a hacker taking control over a camera by infiltrating the processor 105, by implementing the embodiment of FIG. 1, the hacker may only receive an encrypted transmission and will be unable to view the images from the camera, i.e., sensor 130.

Figure 2:
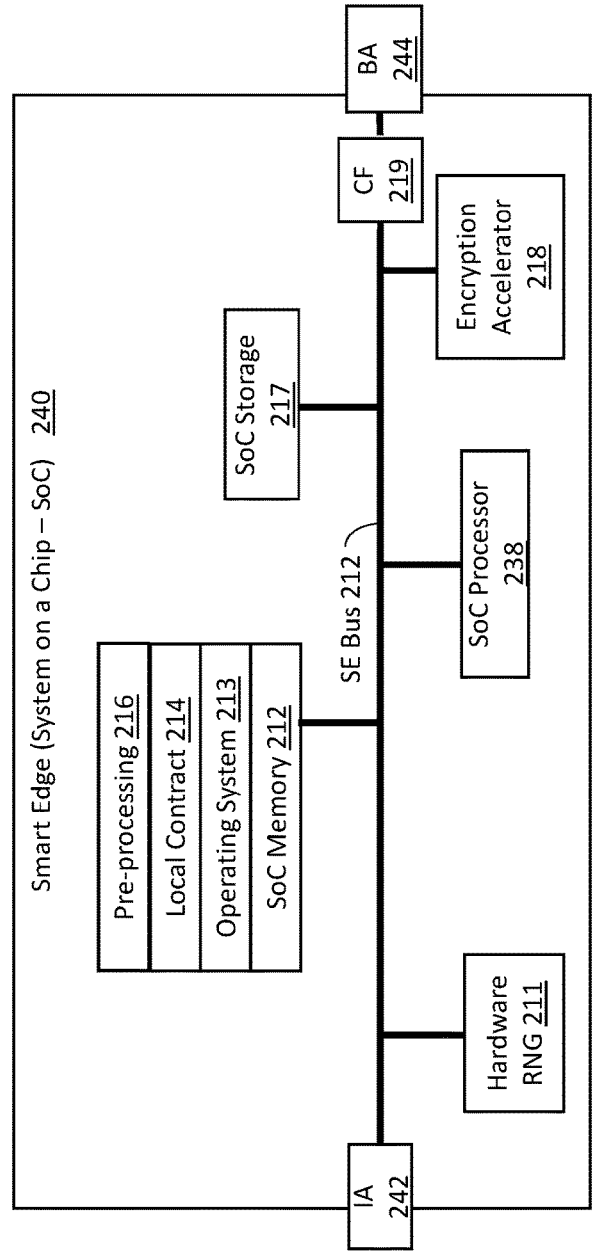
FIG. 2 illustrates a block diagram of a smart edge module according to an embodiment of the invention.

FIG. 2 illustrates an embodiment of smart edge 240, implemented in this example as a system on a chip (SoC). As shown in this example, the smart edge 240 incorporates the interface adapter 242 and bus adapter 244 to handle communication with elements outside the smart edge SoC 240. Communications within smart edge 240 run on internal bus 212, which is considered secure by the smart edge 240. The operations of the smart edge 240 are controlled by the smart edge (SE) processor 238, which executes secured operating system 213, residing in a secure smart edge memory 212.

The OS 213 may be implemented as a minimal version of Linux such as Busybox or a real-time operating system (RTOS). In order to maximize security all unnecessary functionality is removed from both the OS and from necessary protocol stacks. In addition the OS is protected by command and response filters (CF 219). The CF 219 ensures that only necessary commands are passed to the local smart edge OS 213. The purpose is to ensure that it is not possible to trigger unknown OS behavior (e.g., prevent "magic packets"). Response Filters insure that responses to commands can only include known information targeted at known locations.

Smart edge storage 217 is used, among others, to store the local operating system, the un-encrypted Smart Contract (i.e., Configuration Data), local authentication program and local programs. The smart edge storage 217 may also act as a cache for storing sensor data and metadata/logs until successful network transmission.

In this embodiment, all elements outside of the smart edge are considered unsecured, and all elements within the smart edge are considered secured. This is ensured by prohibiting any communication into the smart edge in non-encrypted form. All inbound communications and/or data must be encrypted by a known key to be accepted and handled by the smart edge. Similarly, all outbound communication from the smart edge must first be encrypted.

Anything outside the smart edge that exists in a non-encrypted format or in an encrypted format by an unknown key is assumed unsecure. Consequently, the sensor data exists in a non-encrypted format only inside the secured smart edge. The sensor data can exit the smart edge only in a secure encrypted form. The encryption may be, e.g., Blowfish, Twofish, Simon, etc. Decryption of the encrypted data would require multifactor authentication, using a public and a personal key.

The encryption of the raw data may be performed according to instructions of a local contract 214 stored in the module memory. For increased security the local contract 214 may be a blockchain contract. The hardware RNG 211 and optional encryption accelerator 218 may be used for the encryption and decryption functions. The initial key is set at the factory in the initial local smart contract and must be replaced by the purchaser before use. The initial key is assumed to be unsecure.

As indicated, everything outside the smart edge is considered non-secure. Since driver 104 resides in memory 125, outside the smart edge, it is considered non-secure. On the non-secure side, standard IT procedures may be used to limit incoming information to known hosts using standard firewall technology. Also, TLS (Transport Layer Security) may be used in the unsecure transmission to "wrap" the encrypted information that is being sent to the smart edge, so as to prevent eavesdropping, tampering and/or message forgery.

In one embodiment, when a transmission is received addressed to the sensor 130 or smart edge 140, the non-secure driver 104 may perform a basic check of entropy (randomness) as a "first level" indication of encrypted content. If accepted, the transmission is then inspected by the command filter 219, which attempts to decrypt the file using its private key and look for header information inside the encrypted packet. If the correct heather is found, the process would continue decrypting the payload; otherwise the packet(s) would be discarded. This process is one example of ensuring that only encrypted transmission reaches the smart edge, thus thwarting any malicious attempt to disrupt or alter the operation of the smart edge.

Generally, incoming data transmission would fall into one of five categories: 1) Smart Contract Updates that were requested; 2) Responses to verification/validation requests to configured smart edges (per smart contract); 3) Requests for verification/validation from configured smart edges (per smart contract); 4) Responses for requests for blockchain update (per smart contract); and 5) Pushed blockchain updates (if configured in smart contracts). Also, all contact with smart edge should be originating from known entities and the majority of communication would be coming in response to a request that was sent by the smart edge. Moreover, for highly secure uses, it would be possible for the smart edge to only allow polled responses and reject all other communications. In this case, when the packet header is decrypted, the packet would be discarded if it did not come from the appropriate sender and in response to the correct outstanding request.

Figure 3:
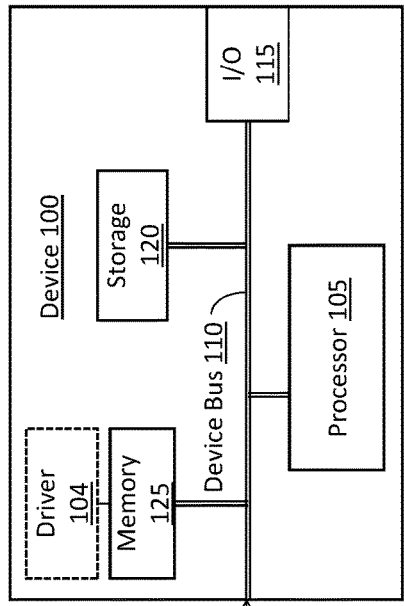
FIG. 3 illustrates a block diagram of a "stand-alone" smart edge module according to an embodiment of the invention.

As indicated above, there are applications wherein the sensor is an element that is separate from the electronic device 100. For example, a cellphone may be operated with a wired or wireless headset, such that the microphone is not an integral part of the device, i.e., the cellphone. FIG. 3 is a block diagram illustrating how the smart edge may be implemented in such applications. The device 100 is shown separate from the smart sensor 102, which is a stand-alone smart sensor incorporating a smart edge 140. In this example, the bus adapter 144 may be, e.g., a Bluetooth device communicating with device bus 100 via a corresponding Bluetooth interface of device 100. In this manner, all of the data from the sensor, e.g., microphone, 130 is transmitted to the device 100, e.g., cellphone, in an encrypted format.

FIG. 3 illustrates another feature that may be implemented in any of the embodiments disclosed herein. Specifically, the smart edge module 140 incorporates a pre-processing module 216 (see also FIG. 2). Pre-processing module 216 conditions and filters the data from the sensor prior to encryption and transmission of the data. This is done, for example, to reduce the amount of data transmitted, such that only usable data is being encrypted and transmitted. To illustrate, turning back to the example wherein sensor 130 is a microphone, part of the raw signal from sensor 130 may include background noise, wind noise, etc. Pre-processing module 216 is configured to operate on the raw signal so as to filter out raw signal that is not from the person speaking into the microphone. The filtering may be done, e.g., by setting a minimum and maximum decibel levels, by setting a frequency range, etc. Consequently, only the signal relating to the spoken words is being encrypted and transmitted. Incidentally, this pre-processing also preserves battery life, as the power requirements of the filtering is much lower than the power requirement of the transmission of all the data from the microphone.

In this aspect, a smart sensor is provided, comprising: at least one sensor generating raw data signal; an interface adapter facilitating communications with the at least one sensor; a smart edge having a processor receiving the raw data signal and generating an encrypted data signal; and a bus adapter transmitting the encrypted data signal. The bus adapted may comprise a wireless transceiver. The smart edge may further comprise a pre-processing module configured to filter the raw data signal prior to the processor generating the encrypted data signal. In this respect, the processor encrypts only part of the raw data signal corresponding to a filtered signal.

Figure 4:
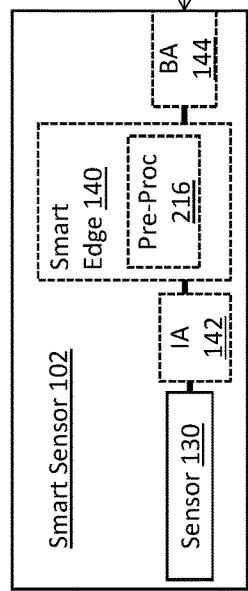
FIG. 4 is a prior art illustration of a smart thermostat.
Figure 4:
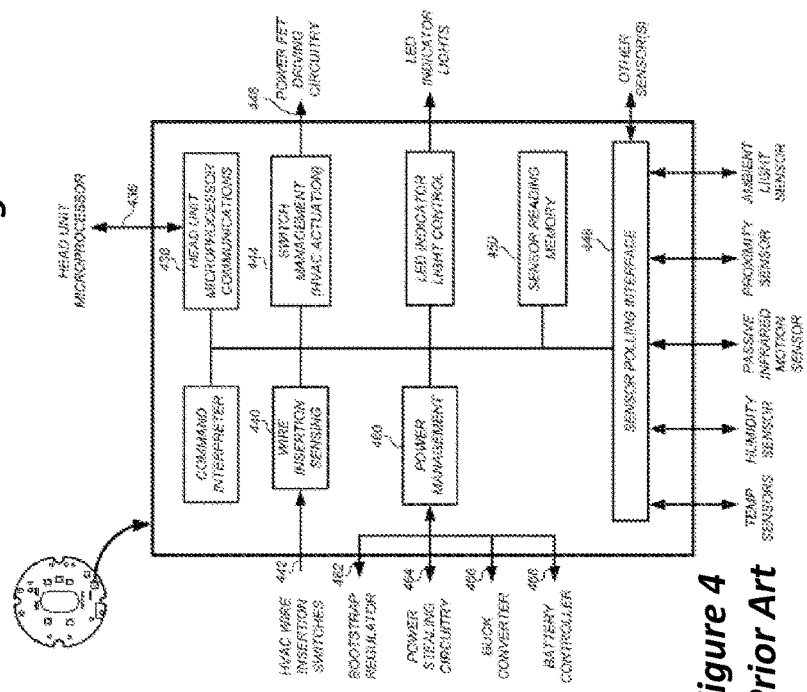

FIG. 4 illustrates a prior art "smart" thermostat, and corresponds to FIG. 4B disclosed in U.S. Pat. No. 8,622,314. As shown, the smart thermostat receives signals from several sensors, such as temperature sensor, humidity sensor, etc. The signal from these sensors is a raw signal and is being polled by the sensor polling interface. Consequently, a hacker gaining access to the thermostat has direct access to all of the raw data from the sensors. This can be prevented by using a smart edge to encrypt the data of the sensors prior to transmission to the thermostat.

Figure 5:
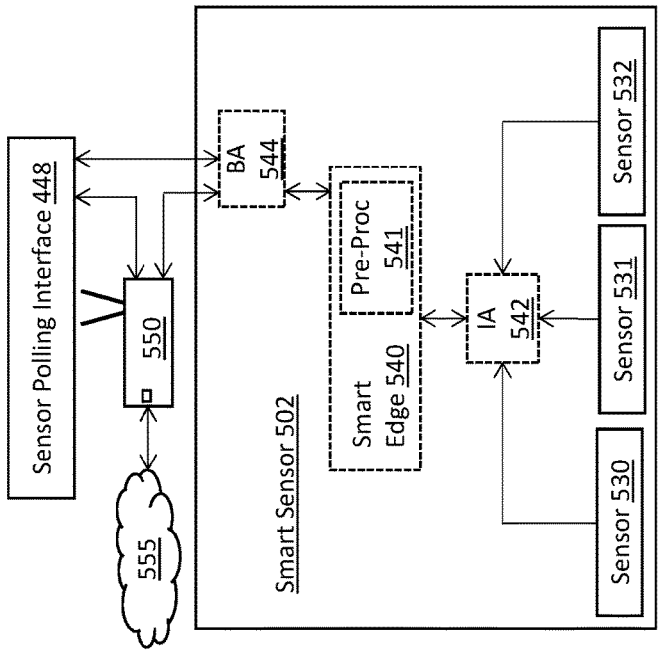
FIG. 5 illustrates a block diagram of a smart edge module implemented for the smart thermostat of FIG. 4, according to an embodiment of the invention.

FIG. 5 illustrates an embodiment of a stand-alone smart sensor, implemented in the context of a device such as the smart thermostat of FIG. 4. As before, FIG. 5 illustrates advantageous features that may also be implemented within the other embodiments and are not limited to their use in the embodiment of FIG. 5. For example, as illustrated in FIG. 5, smart sensor 502 actually includes a plurality of sensors, 530, 531, 532, etc. That is, the disclosed smart edge 540 is not limited to handling raw data of a single sensor, but can be implemented in arrangements wherein several sensors are coupled to a single smart edge 540. In the context of the smart thermostat, a single smart edge 540 may handle all of the raw data from all of the sensors.

Another feature illustrated in FIG. 5 is the option to have the bus adapter 544 communicate directly with the electronic device, e.g., the sensor polling interface 448 of the thermostat, or interface directly with a network via, e.g., modem 550. Notably, by having bus adapter 544 set as a WiFi transceiver communicating with the modem 550, the encrypted data can be utilized with several authorized devices, and is not limited to only a single device. For example, the smart thermostat can access the data by communicating with the smart sensor via modem 550 in an intranet fashion, while a cellphone may access the data remotely via connection to the Internet 555.

Incidentally, for clarity the embodiment of FIG. 5 is illustrated as retaining the polling interface 448. However, it is not necessary to include the poling interface 448. Rather, the data may be encrypted and transferred in a fashion that does not necessitate the polling, or can be transferred to a location that can be polled.

The embodiment of FIG. 5 decouples the generation and encryption of the sensor data from the consuming of the data. Consequently, the generated encrypted data can be consumed by all authorized devices. Such an implementation is particularly useful in IoT applications. For example, a smart LED light bulb can be implemented using the embodiment of FIG. 5. In such an implementation, the bus adapter 544 would be communicating directly with the modem 550, enabling any authorized device to receive the signal from the light bulb and control the operation of the light bulb.

In this aspect, a smart sensor is provided, comprising: a plurality of sensors, each generating raw data signal; an interface adapter facilitating communications with the plurality of sensors; a smart edge having a processor receiving the raw data signal from each of the plurality of sensors and generating an encrypted data signal; and a bus adapter transmitting the encrypted data signal. The bus adapted may comprise a wireless transceiver. The smart edge may further comprise a pre-processing module configured to filter the raw data signal of each of the sensors prior to the processor generating the encrypted data signal.

While this invention has been discussed in terms of exemplary embodiments of specific materials, and specific steps, it should be understood by those skilled in the art that variations of these specific examples may be made and/or used and that such structures and methods will follow from the understanding imparted by the practices described and illustrated as well as the discussions of operations as to facilitate modifications that may be made without departing from the scope of the invention defined by the appended claims.

The invention claimed is:

1. A smart edge module configured to be inserted between a communication bus of an electronic device and a sensor, the electronic device having a device processor running a device operating system, the smart edge module comprising:
    an interface adapter configured for receiving raw data from the sensor;
    a bus adapter configured for handling communications with the device bus;
    a module bus coupled to the interface adapter and bus adapter;
    a module processor configured for encrypting the raw data;
    a module memory storing a module operating system; and
    an encryption accelerator configured for acceleration encryption of the raw data.

2. The smart edge module of claim 1, wherein smart edge module comprises system on a chip.

3. The smart edge module of claim 1, further comprising a device driver configured to intercept communication on said device bus directed to said smart edge module, and perform entropy test on said communication.

4. The smart edge module of claim 1, wherein the device operating system comprises one of Windows OS, iOS, WebOS, or Android, and the module operating system comprises one of a version of Linux or a real-time operating system (RTOS).

5. The smart edge module of claim 1, further comprising a pre-processing module configured to filter or transform the raw data.

6. A smart edge module configured to be inserted between a communication bus of an electronic device and a sensor, the electronic device having a device processor running a device operating system, the smart edge module comprising:
    an interface adapter configured for receiving raw data from the sensor;
    a bus adapter configured for handling communications with the device bus;
    a module bus coupled to the interface adapter and bus adapter;
    a module processor configured for encrypting the raw data;
    a module memory storing a module operating system; and
    wherein the module processor is configured to encrypt the raw data according to instructions of a local contract stored in the module memory.

7. The smart edge module of claim 6, wherein the local contract is a blockchain contract.

8. A smart edge module configured to be inserted between a communication bus of an electronic device and a sensor, the electronic device having a device processor running a device operating system, the smart edge module comprising:
    an interface adapter configured for receiving raw data from the sensor;
    a bus adapter configured for handling communications with the device bus;
    a module bus coupled to the interface adapter and bus adapter;
    a module processor configured for encrypting the raw data;
    a module memory storing a module operating system; and
    a command filter configured to discard unauthorized communication directed at the module processor.

9. The smart edge module of claim 8, wherein the command filter is configured to decrypt incoming communication received by the bus adapter and inspect a header within said communication to determine validity of the communication.

10. The smart edge module of claim 8, further comprising an encryption accelerator configured for acceleration encryption of the raw data.

11. An electronic device, comprising:
    a device processor executing a device operating system (OS);
    a device bus;
    a device memory coupled to the device bus;

a plurality of sensors;

at least one security module, interposed between at least one corresponding sensor of the plurality of sensors and the device bus, the security module configured to receive a raw data signal from the corresponding sensor, encrypt at least part of the raw data signal to generate an encrypted signal, and transmit the encrypted signal to the device bus; and a pre-processing module configured to filter the raw data signal and generate a filtered signal, wherein encrypting at least part of the raw data signal comprises encrypting the filtered signal.

12. An electronic device comprising:

a device processor executing a device operating system (OS);

a device bus;

a device memory coupled to the device bus;

a plurality of sensors;

at least one security module, interposed between at least one corresponding sensor of the plurality of sensors and the device bus, the security module configured to receive a raw data signal from the corresponding sensor, encrypt at least part of the raw data signal to generate an encrypted signal, and transmit the encrypted signal to the device bus; and a device driver residing in the device memory and configured to facilitate communication between the device processor and the security module.

13. The electronic device of claim 12, wherein the security module comprises a module processor running a module operating system different from the device operating system.

14. The electronic device of claim 13, wherein the security module further comprises:

an interface adapter configured for receiving the raw data from the corresponding sensor;

a bus adapter configured for handling communications with the device bus;

a module bus coupled to the interface adapter and bus adapter.

15. The electronic device of claim 14, wherein the security module comprises system on a chip.

16. The electronic device of claim 15, wherein the security module further comprises a command filter configured to discard unauthorized communication directed at the module processor.

17. The electronic device of claim 12, further comprising a pre-processing module configured to filter the raw data signal and generate a filtered signal, wherein encrypting at least part of the raw data signal comprises encrypting the filtered signal.

18. In an electronic device having a device processor running a device operating system on a device bus and communicating with a plurality of sensors, a method comprising:

providing a plurality of security modules and interposing each between a corresponding sensor of the plurality of sensors and the device bus;

operating each of the security modules to perform the steps of:

intercepting raw data signal output from the corresponding sensor;

encrypting at least part of the raw data signal to generate an encrypted signal;

transmitting the encrypted signal onto the device bus; and filtering the raw data signal to generate a filtered signal, wherein encrypting at least part of the raw data signal comprises encrypting the filtered signal.

19. In an electronic device having a device processor running a device operating system on a device bus and communicating with a plurality of sensors, a method comprising:

providing a plurality of security modules and interposing each between a corresponding sensor of the plurality of sensors and the device bus;

operating each of the security modules to perform the steps of:

intercepting raw data signal output from the corresponding sensor;

encrypting at least part of the raw data signal to generate an encrypted signal;

transmitting the encrypted signal onto the device bus; and maintaining a secure contract in a module memory of each of the security modules, and updating the security contract with decryption key and list of authorized readers.

20. The method of claim 19, further comprising maintaining a distributed version-control system for tracking changes in the security contract.

21. The method of claim 19, further comprising filtering the raw data signal to generate a filtered signal, wherein encrypting at least part of the raw data signal comprises encrypting the filtered signal.

22. In an electronic device having a device processor running a device operating system on a device bus and communicating with a plurality of sensors, a method comprising:

providing a plurality of security modules and interposing each between a corresponding sensor of the plurality of sensors and the device bus;

operating each of the security modules to perform the steps of:

intercepting raw data signal output from the corresponding sensor;

encrypting at least part of the raw data signal to generate an encrypted signal;

transmitting the encrypted signal onto the device bus; and operating each of the security modules to perform the further steps of:

intercepting each transmission of the device bus directed at the security module;

decrypting the transmission and deciphering whether a header in the transmission is acceptable header and, if yes, decrypting the remainder of the transmission; otherwise discarding the transmission.

23. The method of claim 22, wherein deciphering whether the header in the transmission is acceptable header comprises determining whether the transmission is a response to an outstanding request issued by the security module.

* * * * *